United States Patent
Difonzo et al.

(10) Patent No.: US 6,574,096 B1
(45) Date of Patent: Jun. 3, 2003

(54) USE OF TITANIUM IN A NOTEBOOK COMPUTER

(75) Inventors: John Difonzo, Emerald Hills, CA (US); Stephen Zadesky, Mountain View, CA (US); David Lundgren, Mill Valley, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/675,538

(22) Filed: Sep. 29, 2000

(51) Int. Cl.⁷ ................................. G06F 1/16
(52) U.S. Cl. ............ 361/683; 361/686; 345/169; 364/708.1
(58) Field of Search .............. 361/679–686; 345/169, 905; 364/708.1

(56) References Cited

U.S. PATENT DOCUMENTS

| | | | | |
|---|---|---|---|---|
| 4,319,795 A | * | 3/1982 | Klaus | 312/330 R |
| 5,364,196 A | * | 11/1994 | Baitz et al. | 400/691 |
| 5,666,261 A | | 9/1997 | Aguilera | |
| 6,125,029 A | * | 9/2000 | Sasaki et al. | 361/681 |
| 6,266,240 B1 | * | 7/2001 | Urban et al. | 361/686 |
| 2001/0015005 A1 | | 8/2001 | Chung et al. | |

FOREIGN PATENT DOCUMENTS

WO  WO 99/47993 A1  9/1999

OTHER PUBLICATIONS

Fujitsu, "Fujitsu Introduces INTERTOP CS300, New Windows CE Handheld PC," Japanese Press Release, May 18, 1999, 3 pages.
IBM, "IBM Introduces the ThinkPad A Series and ThinkPad T Series," Research Triangle Park, N.C., U.S., May 1, 2000, 3 pages.
PCT International Search Report for PCT Int'l Appln No. US 01/42362 mailed Dec. 20, 2002 (7 pages).

* cited by examiner

*Primary Examiner*—Darren Schuberg
*Assistant Examiner*—Yean-Hsi Chang
(74) *Attorney, Agent, or Firm*—Blakely, Sokoloff, Taylor & Zafman LLP

(57) ABSTRACT

The present invention uses titanium and titanium alloys to form the main and display housings of notebook computers. Specifically, the present invention glues injection molded frames to titanium or titanium alloy sheet metal casings. Continuous beads of glue used to overcome the problems formerly associated with shearing. Bayonet recptors formed in the interior of the main casing's bottom case reduce the number of screws needed to attach components forming the main and display housings. Bayonet structures formed in an exterior portion of an injection molded frame slidably mate with the bayonet receptors to look the bottom case of the main housing in position. In some embodiments, the edges of the bottom case are beveled to form a strong five-sided box.

23 Claims, 12 Drawing Sheets

USE OF TITANIUM IN A NOTEBOOK COMPUTER

FIELD OF THE INVENTION

The present invention relates to the manufacture and design of notebook computers. Particularly, the present invention relates to using titanium or titanium alloys in the main and display housings of notebook computers.

BACKGROUND

Notebook computers generally have two main parts, a main housing and a display housing. The main housing typically contains the keyboard and cursor positioning device together with most of the hardware for operating the computer, while the display housing, rotatably hinged to the main housing, typically contains an LCD or other visual screen. Both the main and display housings are generally formed of strong, shock-resistant materials such as polycarbonate, carbon-fiber filled polycarbonate, or other materials suitable for injection molding. Because a notebook computer may be used in a laptop environment such as a train, a taxi cab, or an airliner where it may be dropped, knocked, battered, slapped, jolted, pummeled, smashed, pounded, hammered, or bumped, screws are typically used to fasten the component parts of the notebook computer's main and display housings. Although screws supply needed structural strength, they often mar aesthetic appearances.

Making computer housings of plastic, polycarbonate, or other injection moldable materials furnishes computer housings that are lightweight and durable, easier to fabricate and assemble than computer housings made metals or other stalwart materials, such as titanium or titanium alloys, and inexpensively produced.

On the other hand, manufacturing computer housings of injection moldable materials often creates bland aesthetic appearances, produces computer housings that often shatter when dropped, often requires screwing component parts together, and often allows heat generated from the computer's internal hardware to be transmitted directly through the main housing to a user's lap or hands. If the computer is used for long periods, the warmth can become wholly unbearable. Because of these and other disadvantages, a previously unsatisfied need has existed for notebook computer housings that are manufactured mostly of a strong, lightweight, and heat-insulating material, like titanium or a titanium alloy. An aspect of the present invention that helps overcome the disadvantages associated with the prior art is the use of titanium in the computer housings.

Titanium is appreciated in many arts for its lightness, strength, durability, and non-magnetic properties. Additionally, titanium can be formed into thin sheets that can be both strong light. Titanium and its alloys, however, are not currently used to manufacture notebook computer housings because it is very difficult to fabricate titanium and very difficult to join titanium securely to non-titanium materials such as polycarbonate. In fact, titanium can only be fabricated using special tools and processing methods, which include, inter alia: casting, hot working (forging, extrusion, rolling, superplastic forming, diffusion bonding), cutting, machining, milling, turning, drilling, chemical milling, welding, and superplastic forming. Additionally, titanium and titanium alloys can be cut by conventional band saws, torches, water jets, and lasers. Moreover, special tools and methods are required to place screw holes in titanium metal or titanium alloys. Exemplary tools and methods include: reaming with standard carbide and high speed steel reamers, drilling with lasers, and broaching with wet and dry broach tools.

As mentioned above, it is very difficult to join titanium to non-titanium materials such as polycarbonate. For example, fusion welding, resistance welding, and similar welding methods can be used to join titanium and its weldable alloys, but such methods are not suitable for joining titanium to other materials. Instead, titanium is often fastened to other materials using mechanical fasteners (e.g. screws, rivets, etc.), friction welding, brazing, and explosive bonding. Titanium is not typically used to fabricate housings for laptop computers because it is difficult to form fittings or other details into titanium. Without details and fittings, the titanium is difficult to connect to other materials to form an enclosure. In one instance, a titanium exterior shell has been secured by screws to a plastic cover of a display housing. One reason that screws are used is that the user (or a repairman) needs to be able to access the internal elements in the enclosure of the laptop.

Gluing two components together is well known in the art. However, computer housings were not glued together for several reasons. It was commonly thought and taught in the art that housings whose components were glued together would be weak and easily breakable. Moreover, it was thought that a glued computer housing precluded the ability to repair or replace items contained within the case. In spite of such thoughts and teachings, embodiments of the present invention provide for gluing titanium sheet metal to polycarbonate components, or to components made of a similar material, to form computer housings that are strong, lightweight, durable, aesthetically pleasing, and internally-accessible.

SUMMARY OF THE INVENTION

An embodiment of the present invention includes a laptop computer that has a display housing and a main housing. The main housing is rotatably coupled to the display housing. At least the case of the main housing comprises titanium.

These and other features and advantages of the present invention will be apparent from the accompanying drawings and from the detailed description that follow.

BRIEF DESCRIPTION OF THE DRAWINGS

The present invention is illustrated by way of example, and not by way of limitation, in the Figures accompanying this text. In the drawings, like reference numerals reference similar elements.

DETAILED DESCRIPTION OF THE INVENTION

Bottoms of the main housings of notebook computers are a problem area, because much of the heat generated within the housings escapes via conduction through the bottom. This is bad for the user who uses a computer on his lap. The simple solution is to make the bottom out of a thick insulating material such as plastic. However, notebook computer customers also want their computers to be thin and light. A metal such as aluminum would be a good choice, but aluminum's thermal conductivity is 150–235 w/mK. It will feel very hot to the user.

The right choice for portable computer enclosure surfaces including bottoms, should combine high strength with low weight. The optimum choice is titanium, a good heat insulator, which has a thermal conductivity of approximately 22 W/mK. Some titanium alloys such as G-4, are stronger than and have even lower thermal conductivity than pure titanium. Titanium is especially advantageous when designing a very thin enclosure, because its strength and manufacturing properties allow the use of very thin sheet stock to be formed into housing components. Aspects of the present invention may be used with other types of electronic devices such as personal data assistants and cell phones.

Figure 1:
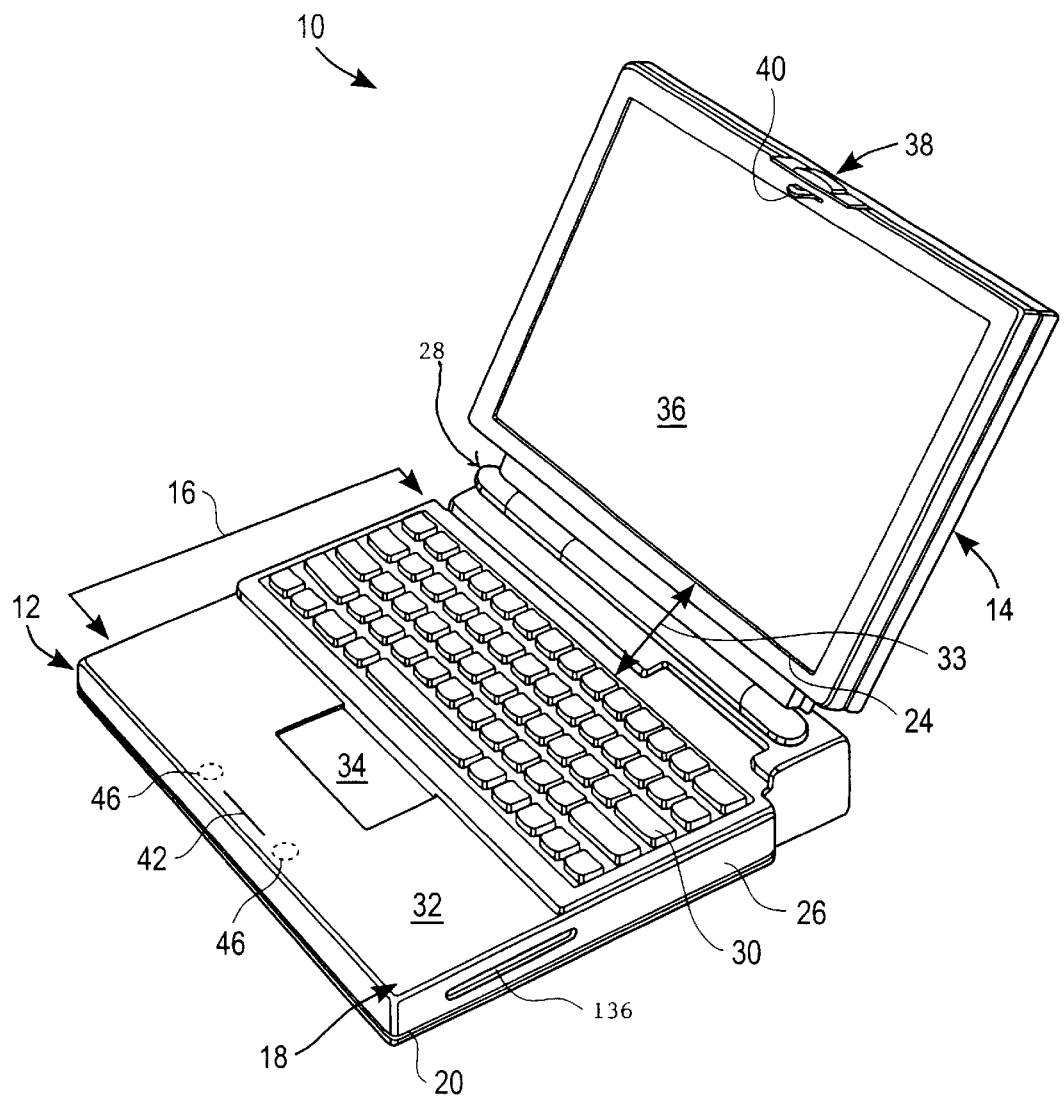
FIG. 1 shows an example of a notebook computer generally.

FIG. 1 shows an illustrative drawing of a notebook computer 10 generally. Components associated with computer 10 include main housing 12, display housing 14, and keyboard, palm rest and cursor positioning device combination 16. Although computer 10 can be any of a variety of computers, computer 10 in the present preferred embodiment is a Powerbook line of laptop computers. More specifically, computer 10 is a notebook computer, which is a single, integrated unit having all of its elements placed within two rotatably connected housings. Moreover, computer 10 is small enough to fit on a user's lap.

In a preferred embodiment, main top surface 18, main bottom surface 120 (not shown), display top surface 174 (not shown), and display bezel 24 are each fabricated of titanium or a titanium alloy. Perimeter frame 26 and components of rotatable clutch means 28, in a preferred embodiment, are made of an injection-molded material such as polycarbonate. A combination of plastic glued to titanium is used according to one aspect of the invention because plastic or polycarbonate that is glued to Titanium provides features for internal components and mechanisms that would be difficult to implement working exclusively with Titanium. As shown in FIG. 1, main top surface 18 forms a top exterior surface (e.g. palm rest area 32) of the main housing 12, bottom surface 120 forms a bottom exterior surface of the main housing 12, while perimeter frame 26 is gluably sandwiched between main top surface 18 and main bottom surface 120.

When computer 10 is operated by a user, bottom surface 120 may rest on the user's lap (or a desk's surface), and the user's hands (e.g. palms) may rest on the computer's palm-rest. In one embodiment, the bottom surface 120 and top surface 18 are formed entirely from a titanium (or titanium alloy) sheet metal.

Inside main housing 12 there are all essential and well-known electronic circuitry for the computer's operation, such as microprocessor, memory, hard disk drive and/or floppy disk drive and/or CD/DVD drives, input/output circuitry and power supply. Such electronic circuitry for a notebook computer is well known; one example of a laptop computer is the Macintosh Powerbook line of laptop computers from Apple Computer, Inc. of Cupertino, Calif., the assignee of the present invention.

On top of main housing 12 are the keyboard, palm rest, and cursor positioning device combination 16. The combination 16 includes a conventional keyboard 30, a palm rest 32, and a cursor-positioning device, typically a trackpad 34. Keyboard 30 and cursor positioning device 34 allow a user to communicate with (e.g. input data into) computer 10. Palm rest 32 supplies a supporting case for the user's hands to rest against when using keyboard 30.

Disposed over the keyboard, palm rest, and cursor positioning device combination 16, is a display housing 14, which contains the display screen 36. Display housing 14 is coupled to main housing 12 by a conventional clutch means 28, which allows display housing 14 to act as a cover for main housing 12 such that from the closed position (shown in FIG. 2), the display housing 14 can be opened upwards, revealing the keyboard 30, palm rest 32, and cursor control device 34. The cursor device 34 is located in the palmrest 32. Display housing 14 is rotatably coupled to the main housing 12. When the display housing is positioned at an angle between 65° and 130° relative to said main housing, a posterior most row of keys of the keyboard is proximally adjacent to a bottom viewable area of the display housing 14. In an illustrative embodiment, the distance 33 between the posterior most row of keys and the bottom area of display housing 14 is approximately 17 mm to 45 mm when display housing 14 is positioned at an angle of approximately 100° to 130°. According to an aspect of the present invention, a distance 33 is about 17 mm to about 35 mm.

Display housing 14 includes a display unit, which contains a display screen 36 and associated video circuitry (not shown). In the preferred embodiment, display screen 36 is a liquid crystal display unit. In an alternative embodiment, display screen 36 can be other well-known display devices. In some embodiments, display housing 14 includes brightness and contrast controls.

Figure 2:
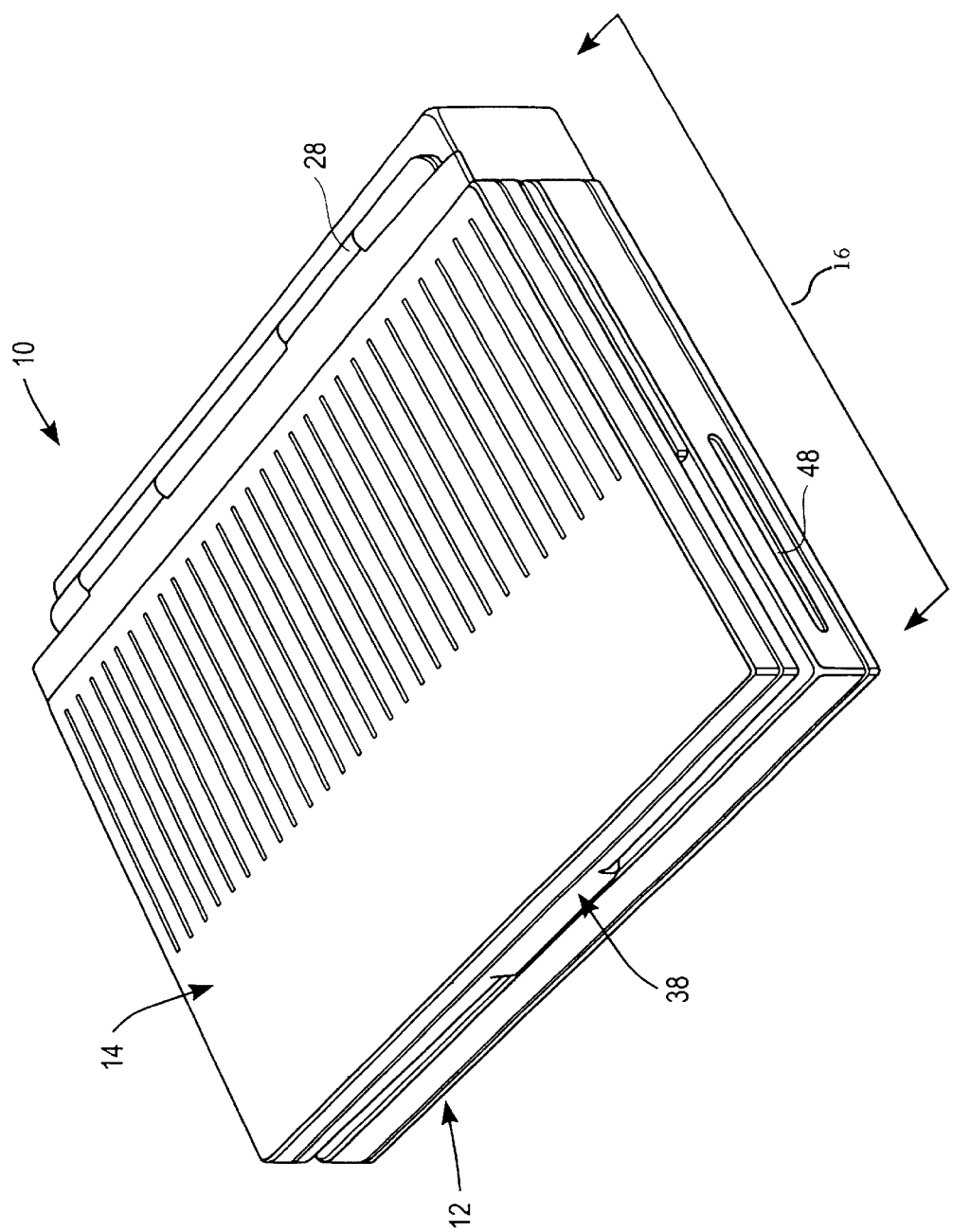
FIG. 2 shows an exemplary view of a notebook computer in the closed position.

FIG. 2 shows a perspective view of computer 10 in the closed position. When closed, display housing 14 covers the keyboard/palm rest/cursor control combination 16, thus protecting keyboard 30, palm rest 32, cursor positioning device 34, and display screen 36 while computer 10 is being transported. Display screen 36 is visible to the user when display housing 14 is lifted upwards. When computer 10 is closed, a latch assembly 38 holds display case 14 in the closed position. As shown in FIG. 1, a bay 136 included on the right side of main housing 12 allows a CD/DVD drive or other peripheral device to be inserted within main housing 12.

Figure 3:
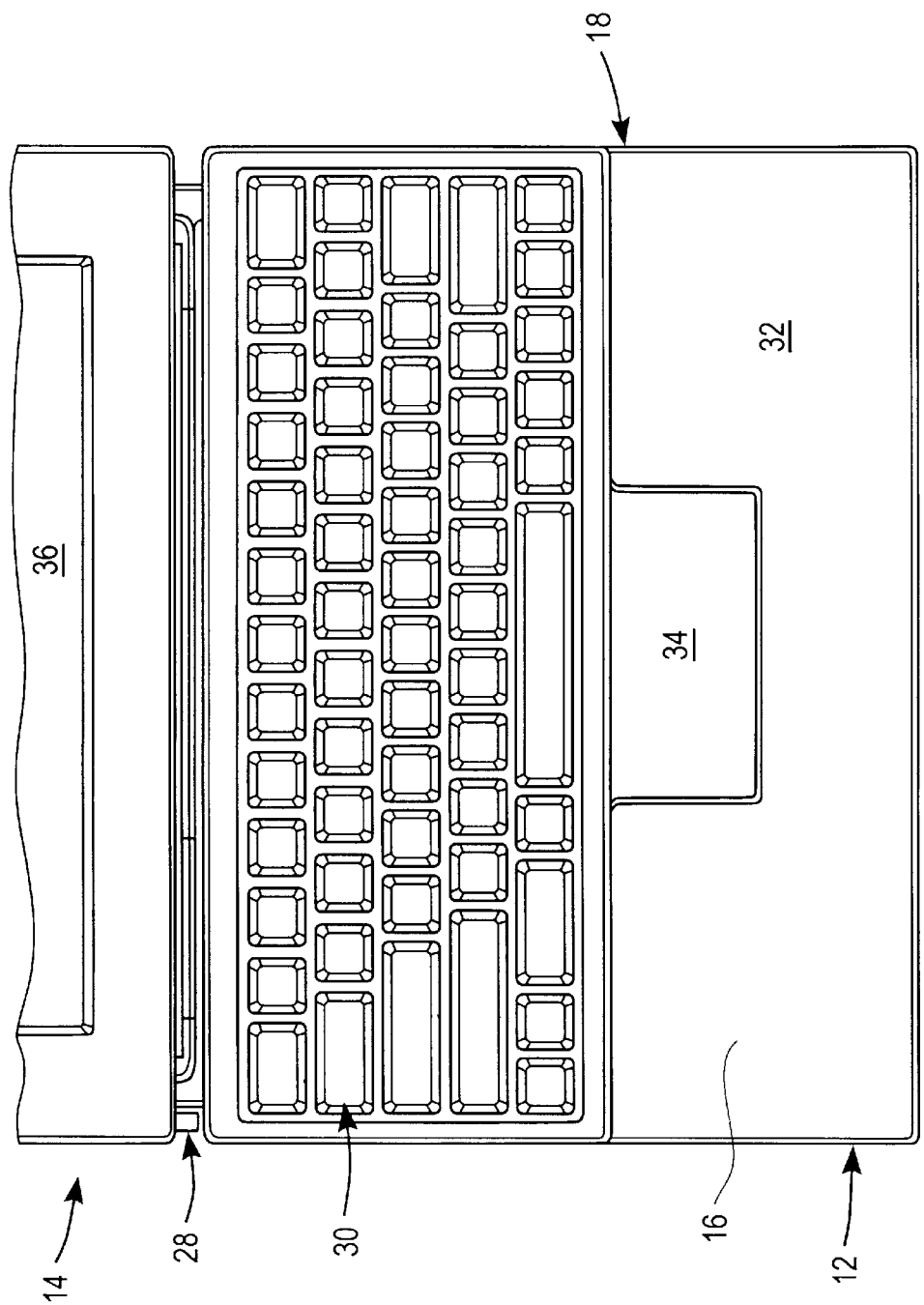
FIG. 3 provides an overhead view of the top of the main casing of an open notebook computer.

Referring now to FIG. 3, combination 16 of the presently preferred embodiments has an overall length of approximately 300–350 mm and width of approximately 250–275 mm. According to another aspect of the invention, keyboard 30 and palm rest 32 occupy almost all of the main top surface 18 of the main housing 12, with a portion of the main top surface 18 supporting clutch means 28 and the display housing 14. The width of the palm rest 32 is the approximately the same as the width of main housing 12. In an alternative embodiment, the relative sizes of keyboard 30, palm rest 32, and cursor positioning device 34 can be made larger or smaller (in the range of up to 20% larger or smaller).

In a preferred embodiment, keyboard 30 is located on the upper end of main top surface 18 of main housing 12, away from the front edge of the computer, and is thereby close to rotatable clutch 28. Keyboard 30 can be a conventional "QWERTY" keyboard, which includes a large, elongated space bar key in the bottom row of the keyboard. In the presently preferred embodiment, the dimensions of the keyboard 30 are about 275 mm by approximately 100 mm wide. In an alternative embodiment, other types of keyboards can be employed.

The specific type of keyboard (e.g. a "QWERTY" keyboard) that is used is not critical to the present invention. The keycaps in the presently preferred embodiment are slightly smaller than standard keycaps. Moreover, the pitch spacing between the keycaps in the presently preferred embodiment for the alphanumeric keys is smaller than standard pitch spacing. The vertical pitch spacing between adjacent keycaps is approximately 18.5 mm (e.g. the distance between centers of the keycaps "S" and "W" for a "QWERTY" keyboard is approximately 18.5 mm) and the horizontal pitch spacing for adjacent keycaps is approximately 19 mm (e.g. the horizontal distance between the centers of "Q" and "W" for a "QWERTY" keyboard is approximately 19 mm). It will be apparent to one skilled in the art that modifying the size of the keyboard 30 to implement a particular embodiment of the invention will cause modification of the size of the keycaps and the spacing between the keycaps.

According to another aspect of the invention, as illustrated in FIG. 3, the keyboard is not elevated above the palm rest area.

According to another aspect of the invention, palm rest 32 is positioned on or within the exterior of main top surface 18 of main housing 12 below keyboard 30. Illustratively, palm rest 32 extends away from keyboard 30 towards the user of the computer. Palm rest 32 allows a computer user's hands and/or wrists to rest against a surface which is an integral part of the laptop computer when using the keyboard 30 or cursor positioning device 34, when the computer is resting on the user's lap rather than on a desktop. This permits the user to extend his/her arms away from the body in a more relaxed state, reducing muscle fatigue in the arms and shoulders. The space provided by palm rest 32 should be large enough to hold the user's palms or wrists. A palm rest for adults hands will be larger than a palm rest appropriate for laptop computers dedicated to children. Increasing the size of palm rest 32 will naturally provide more support for the user's hands and/or palms, but palm rest 32 should not be excessively large in order to not unnecessarily enlarge the physical size of the computer 10. In an alternative embodiment, palm rest 32 may have a gentle slope relative to the bottom surface of the main housing 12.

In a preferred embodiment, positioning keyboard 30 adjacent to rotatable clutch means 28 causes the keyboard 30 to be placed away from the user, and causes the palm rest 32 to be made available for the user to extend his/her hands or wrists away from the user's body (giving "elbow room"). It also allows cursor positioning device 34 to be ergonomically located, as is illustrated in FIG. 3, so that the user is able to operate cursor positioning device 34 without having to remove the hands from the "home row" position on the keyboard 30.

In some embodiments, cursor positioning device 34 is mounted in the palm rest area near the center of palm rest 32, below keyboard 30 and typically below the space bar in the bottom row of keyboard 30. Cursor positioning device 34 allows the user to control the movement of a movable cursor (not shown) on the display screen 36 in the conventional manner and to select a desired operation, such as the selection of a software option by moving the cursor with the cursor positioning device 34 and by signaling selections by tapping keypad 34, as described below. The cursor positioning device 34 may be any one of the well known means for positioning a cursor, including a touchpad, a trackball, or other device.

In a preferred embodiment, cursor positioning device 34 is a conventional trackpad. An example of a conventional trackpad can be found in the Macintosh Powerbook line of laptop computers from Apple Computer, Inc. of Cupertino, Calif. In the presently preferred embodiment, trackpad 34 is approximately 50 mm by 70 mm wide, but the dimensions of the trackpad 34 can vary according to design requirements and modifications made to the dimensions of main housing 12, palm rest 32, and keyboard 30. The top surface of trackpad 34 may be mounted flush with the exterior surface of main top surface 18 of main housing 12, but in the preferred embodiment is recessed slightly (about 1 mm) below the exterior surface to allow the user to help the user's hands to locate cursor positioning device 34 without the user having to take his/her eyes from the display screen 36. In another embodiment, a raised ridge (not shown) may form the perimeter of the trackpad 34.

Figure 4A:
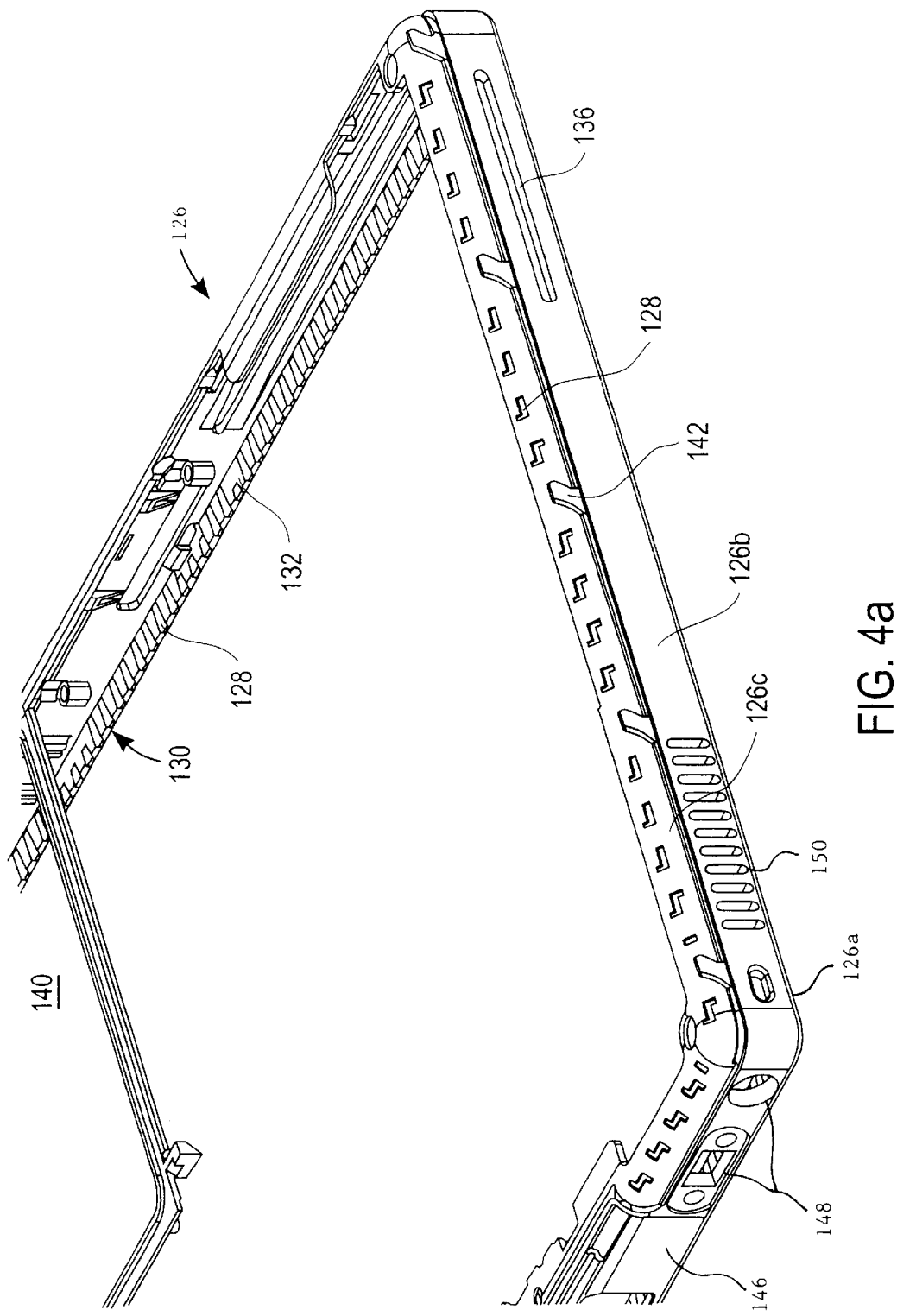
FIG. 4a shows a perspective view of an exemplary embodiment of the frame a notebook computer's main housing according to one aspect of the present invention. In this view, the frame is shown upside down, with its bottom side on top.

Referring to FIG. 4a, there is shown, according to a preferred embodiment of the present invention, a perspective view of perimeter frame 126. In FIG. 4a, perimeter frame 126 is shown depicted upside down. The back of perimeter frame 126 appears at the bottom left corner of the drawing and the front of perimeter frame 126 extends from the upper left hand corner towards the bottom right hand corner. The right-hand side of perimeter frame 126 extends from the bottom left corner of the drawing upwards towards upper right-hand corner. The titanium main bottom surface 120 and titanium main top surface 18 of main housing 12 have been omitted from FIG. 4a to better show the details of perimeter frame 126.

Perimeter frame 126 includes top perimeter frame 126a, middle perimeter frame 126b, and bottom perimeter frame 126c. In a presently preferred embodiment, the three perimeter frames may be formed as one piece in an injection mold. However, it is understood that the three perimeter frames may be separate components, each fabricated of an injection molded plastic material like polycarbonate and are joined together as shown in FIG. 4a.

According to one aspect of the present invention, perimeter frame 126 may include a series of glue points formed therein, which take the illustrative form of glue grooves/pockets 128. Glue grooves 128 are typically wedge shaped, but any suitable shape providing suitable gluing characteristics is contemplated. In a presently preferred embodiment, glue grooves 128 are formed in a portion of top perimeter frame 126a, as illustratively shown in FIG. 4a. Illustratively, glue grooves 128 measure about 5 mm at their widest point, about 2 mm at their narrowest point, and are about 5 mm long. In some embodiments, the glue grooves 128 are recessed within the underside lip portion 62 of top perimeter frame 126a a distance of about 1 mm and are spaced about 5 mm apart. It will be appreciated that the dimensions and spacing of the glue grooves 128 may be adjusted relative to the size of the top perimeter frame 126a. A lip 130 runs across the length of the widest ends of glue grooves 128 and measures about 2 mm thick. The function of glue grooves 128 is to improve the bonding characteristics of glue applied to the bottom lip portion of perimeter frame 126a.

According to another aspect of the invention, frame 126 can be manufactured without glue pockets 128 to provide components having smooth planar gluing surfaces to which a steady stream of liquid or semi-liquid glue can be applied. As is known in the art, single beads (strips) of glue have a tendency to shear. Once begun, a shear typically propagates the length of the glue bead, separating it from the gluing surface. Shearing may be reduced or overcome by either applying multiple streams of glue to a particular area, by increasing the amount of glue applied to a particular area, by separating the streams of glue into individual, irregularly shaped beads, and/or by applying a single, continuous bead of glue about the perimeter of the gluing surface. The last type of gluing method is typically used, according to an aspect of the present invention, especially at the various corners of the gluing surfaces. According to another aspect of the invention, the smooth planar gluing surfaces are spaced approximately 0.15–0.7 mm apart, but this dimension varies according to the type of glue used.

Virtually any type of glue suitable for bonding injection molded materials to titanium or titanium alloys may be used. An exemplary glue suitable for use in various embodiments of the present invention is Lord's glue 201/19 manufactured by the Lord Corporation of Cary, N.C. Conductive glues such as those derived from nickel and silver may also be used to seal the edges of the main and display housings. Conductive glues are often used to dissipate the effects of electromagnetic interference within the interior of computer housings.

Figure 4B:
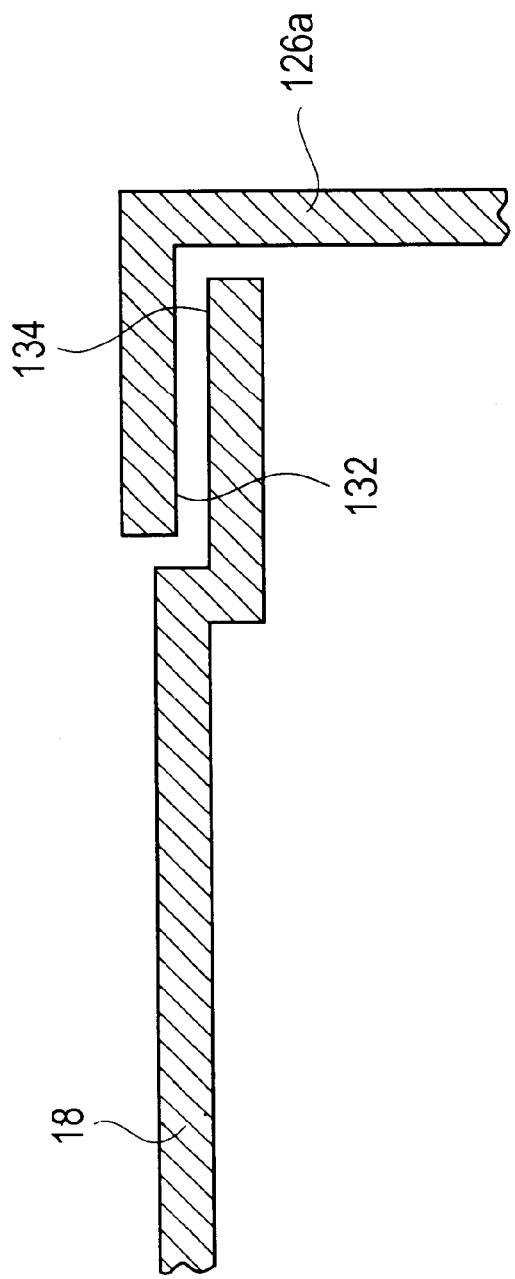
FIG. 4b shows a cross sectional side view illustrating how the top case attaches to the perimeter frame of a notebook computer according to another aspect of the invention.

FIG. 4b illustrates how main top surface 18 is bonded to underside lip portion 132 of top perimeter frame 126a. Main top surface 18 is bent across its width in an S-like fashion to form a bonding area 134 corresponding approximately in width to the width of underside lip portion 132. Additionally, the depth of the S-bend formed in main top surface 18 approximately corresponds to the thickness of underside lip portion 132 such that the exterior surface of main top surface 18 is mounted approximately flush with the exterior surface of underside lip portion 132

Figure 4C:
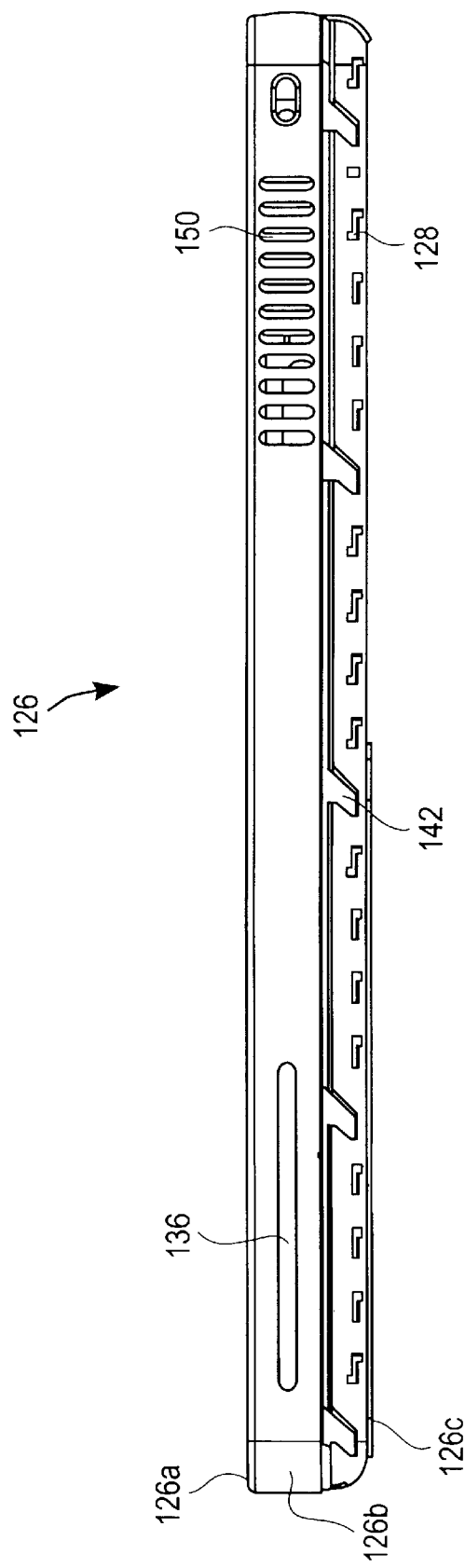
FIG. 4c provides a side view of the of the frame of a computer's main housing according to another aspect of the invention.

As shown in FIGS. 4a and 4c, according to an aspect of the invention, glue pockets 128 may be formed in the exterior surface of bottom perimeter frame 126c. Typically, glue pockets 128 are irregularly shaped and are individually separated.

According to an exemplary embodiment shown in FIGS. 4a and 4c, perimeter frame 126 includes the following illustrative components: bay 136, battery bay 140, bayonet features 142, and glue pockets 128. Additionally, and as illustrated in FIGS. 4a and 4c, frame 126 generally includes a hinged access door 146, one or more peripheral ports 148, and cooling slots 150. As will be described in the next section, bayonet features 142 correspond to bayonet receptors 144, which are illustratively formed in bottom case perimeter frame 126d as shown in FIG. 5.

Figure 5:
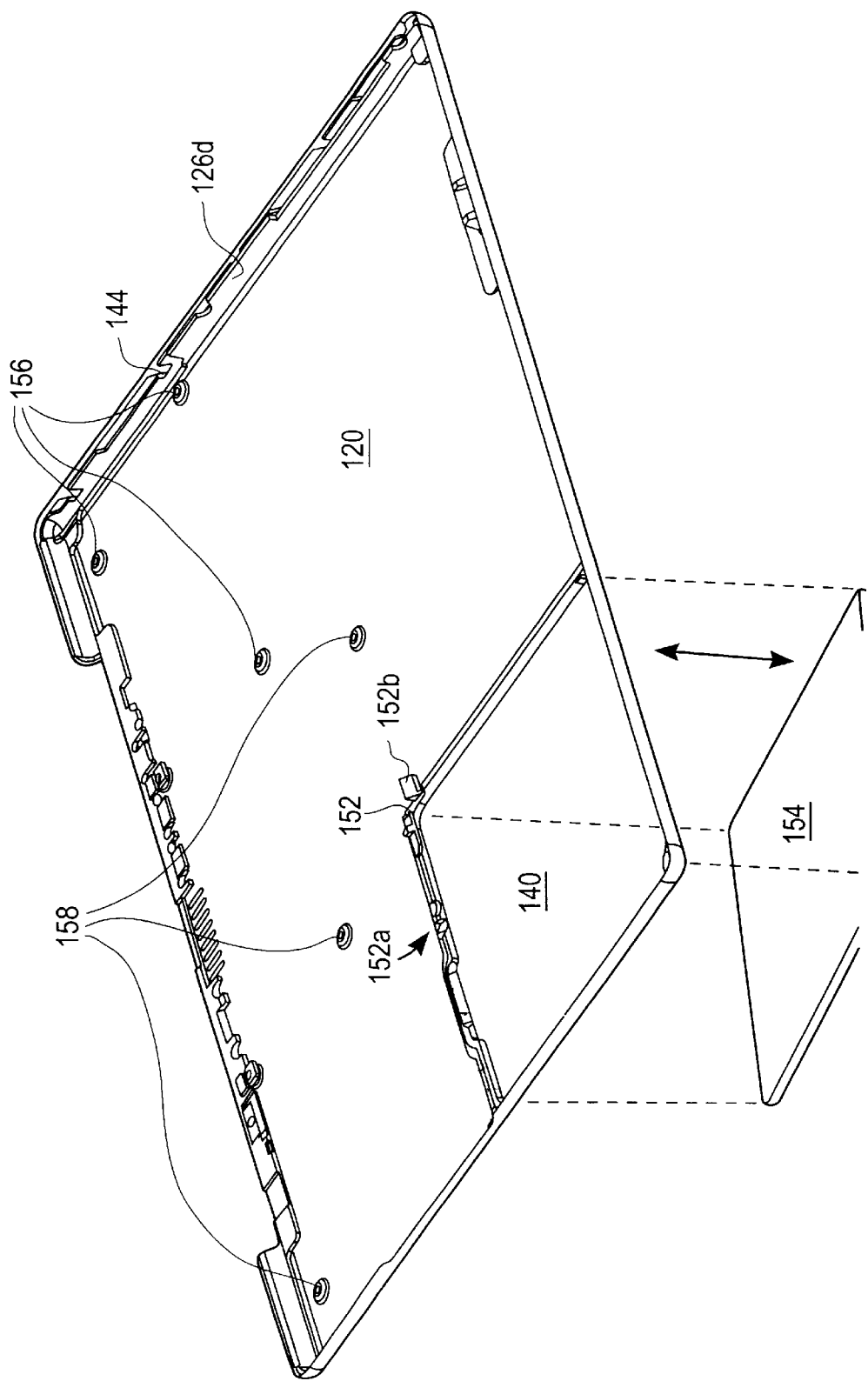
FIG. 5 shows a perspective view of the bottom case of a computer's main housing and illustrates how the plastic frame attaches to the bottom case according to yet another aspect of the invention.

FIG. 5 shows an exemplary embodiment according to one aspect of the invention. According to one aspect of the invention, bottom case perimeter frame 126d is formed of injection molded plastic, polycarbonate, carbon fiber, or similar materials having smooth planar gluing surfaces, and is glued within the beveled edges of bottom case 120 using a continuous bead of glue.

Preferably, the boundaries of battery bay 140 are defined by support bracket 152, which is coupled to the right and front sides of bottom case perimeter frame 126d to form a square. When battery pack 154 is removably inserted into battery bay 140, the bottom exterior surface of replaceable battery pack 154 is approximately flush with the exterior surface of main bottom surface 120 of main housing 12. It is contemplated that battery bay 140 may be formed and positioned within any part of the horizontal plane defined by the main bottom surface 120. However, positioning battery bay 140 in a corner as shown provides the strongest structural geometry using a minimal number of molded support brackets 152. Structural support for battery bay 140 is provided by attaching support bracket(s) 152 to the titanium main bottom surface 120 and to bottom case perimeter frame 126d. Preferably, the shape of battery bay 140 is square, but any shape suitable for accommodating a replaceable battery pack 154 may be used.

In the preferred embodiment, battery bay 140 measures approximately 100 mm by 140 mm wide, but these dimensions will vary depending upon the size of the replaceable battery pack 154 to be supported and the overall dimensions of main housing 12. Additionally, in the preferred embodiment, several catches attached to support bracket 152 are provided. These catches are of the type commonly found in the art, and the present invention is not limited to the two types of catches shown in FIGS. 4a and 5. Any suitable catch means may be employed, whether one or several in number.

Referring to FIG. 5, first catch means 152a, formed within a portion of first support bracket 152, includes a semicircular or cylindrical catch detent. Preferably, second catch means 152b is formed near the corner portion of second support bracket 152, but it is understood that either catch means may be positioned at any suitable point along support bracket 152. In a preferred embodiment, second catch means 152b includes a small rectangular block sliced at a sharp angle from the top back portion down to a lip on the bottom front portion.

A unique feature of the present invention is the way in which titanium main bottom surface 120 removably but securely attaches to bottom perimeter frame 126c using only six screws positioned as shown in FIG. 5. According to one aspect of the invention, a first trio of screw holes 156 is bored in the right rear corner of titanium main bottom surface 120 in a pattern roughly approximating an equilateral triangle. However, any pattern may be used. The second trio of screw holes 158 is positioned in an approximately straight line beginning in the left rear corner of bottom case 120 and extending towards its center. The second trio, like the first, need not be positioned as shown in FIG. 5, and it is understood that screw holes 156 and 158 may be positioned at any suitable point on bottom case 120. According to another aspect of the invention, all six screw holes are recessed such that the top of the screw head mounts flush with or slightly beneath the exterior surface of main bottom surface 120 (as shown in FIG. 6).

According to another aspect of the invention, main bottom surface 120 is one piece formed entirely of titanium or a titanium alloy and has six screw holes drilled therein and a cut out area corresponding to bay area 50 as shown in FIG. 5. Referring to FIG. 5, it is shown that the linear and corner edges of titanium main bottom surface 120 bevel upwards in a curved fashion. Components of bottom case perimeter frame 126d are glued along the beveled sides of main bottom surface 120, whose beveled edges and planar bottom surface form a five-sided box structure, which has great rigidity.

As shown in FIGS. 4a and 5, according to aspect of the present invention, the corners of bottom perimeter frame 126c and top perimeter frame 126a are rounded to present a more pleasing aesthetic appearance and to prevent the corners from snagging on soft materials such as clothes or skin. Center perimeter frame 126b, like top perimeter frame 126a and bottom perimeter frame 126c, has rounded corners and is formed of an injection molded material like polycarbonate. Center perimeter frame 126b may include a variety of colors and textures for stylistic purposes. One side of center perimeter frame 126b, preferably the right-hand side, includes a bay 136 into which a peripheral device such as a CD/DVD player or modem can be inserted, and a series of oval cooling slots 150 positioned near the rear of the right-hand side of center perimeter frame 126b.

Figure 6:
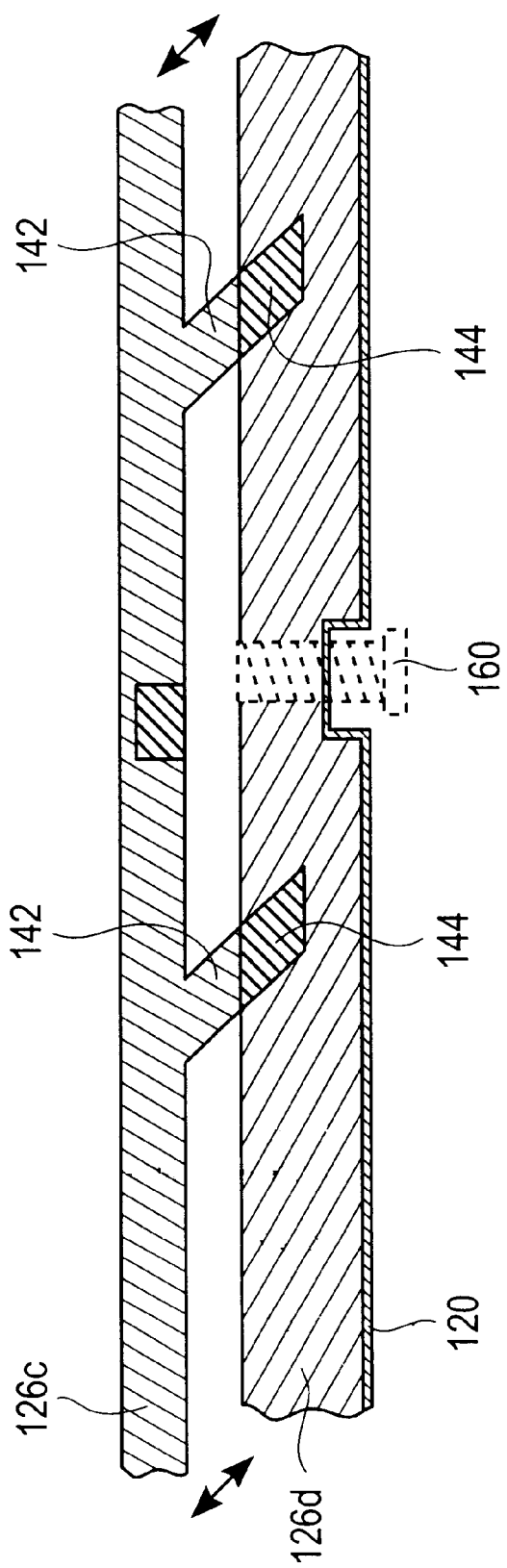
FIG. 6 illustrates how a titanium bottom piece affixes to a plastic frame using bayonet wedge and bayonet receptor features, according to an aspect of the present invention.

FIG. 6 illustrates another exemplary embodiment of the invention and shows only one screw 160 is needed to hold titanium bottom case 120 in position. When bottom case 120 is slidably fitted into position as shown in FIG. 6, bayonet receptors 144 mating with bayonet features 142 prevent bottom case from falling off bottom perimeter frame 126c if computer 10 were vertically lifted off of a support structure and no screws were attached. In a preferred embodiment, both bayonet features 142 and bayonet receptors 144 are fashioned to angle about 45 degrees from the horizontal, but any number of a wide variety of angles may be used. The six screws mentioned above are provided to keep main bottom surface 120 from sliding sideways in such a manner as to detachably disengage the bayonet features 142 from their corresponding receptors 144.

Figure 7:
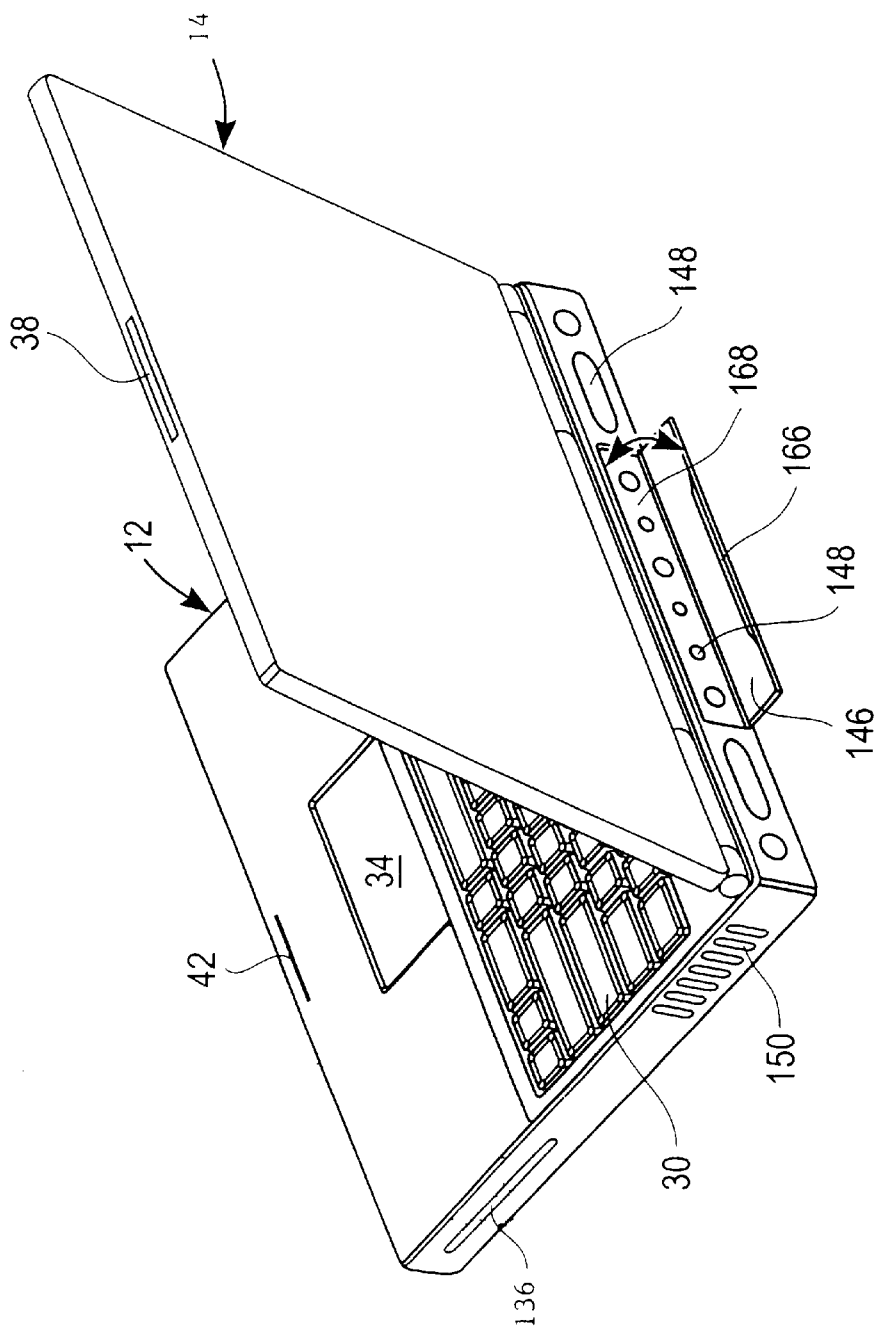
FIG. 7 provides a perspective view of the rear portion of a notebook computer showing the peripheral port access door in an open position, according to another aspect of the invention.

An exemplary embodiment of the invention will now be described with reference to FIGS. 7, 8 and 9. FIG. 7 shows another exemplary embodiment of the present invention. In this Figure, the back portion of center perimeter frame 126b is illustratively adapted to include a number of peripheral ports 148 such as are commonly included in notebook computers. According to one aspect of the invention, access door 146 is centrally mounted on the backside of center perimeter frame 126b. A pivot means 162 (shown in FIG. 9) mounted in pivot area 164 (shown in FIG. 8) couples the bottom portion of titanium access door 146 to the back portion of center perimeter frame 126b and a latch means 166 (not shown) secures access door 146 in the closed position. Typically, the latch means includes, but is not limited to, a magnet or magnets (not shown) implanted within the back portion of center perimeter frame 126b. Additionally, the latch means could include a spring mounted in pivot means 162 to bias access door 146 in the closed position. Preferably, the access door 146 is made of titanium or a titanium alloy, however any number of suitable materials may be used, for example, plastic, stainless steel, brass, wood, etc.

Figure 8:
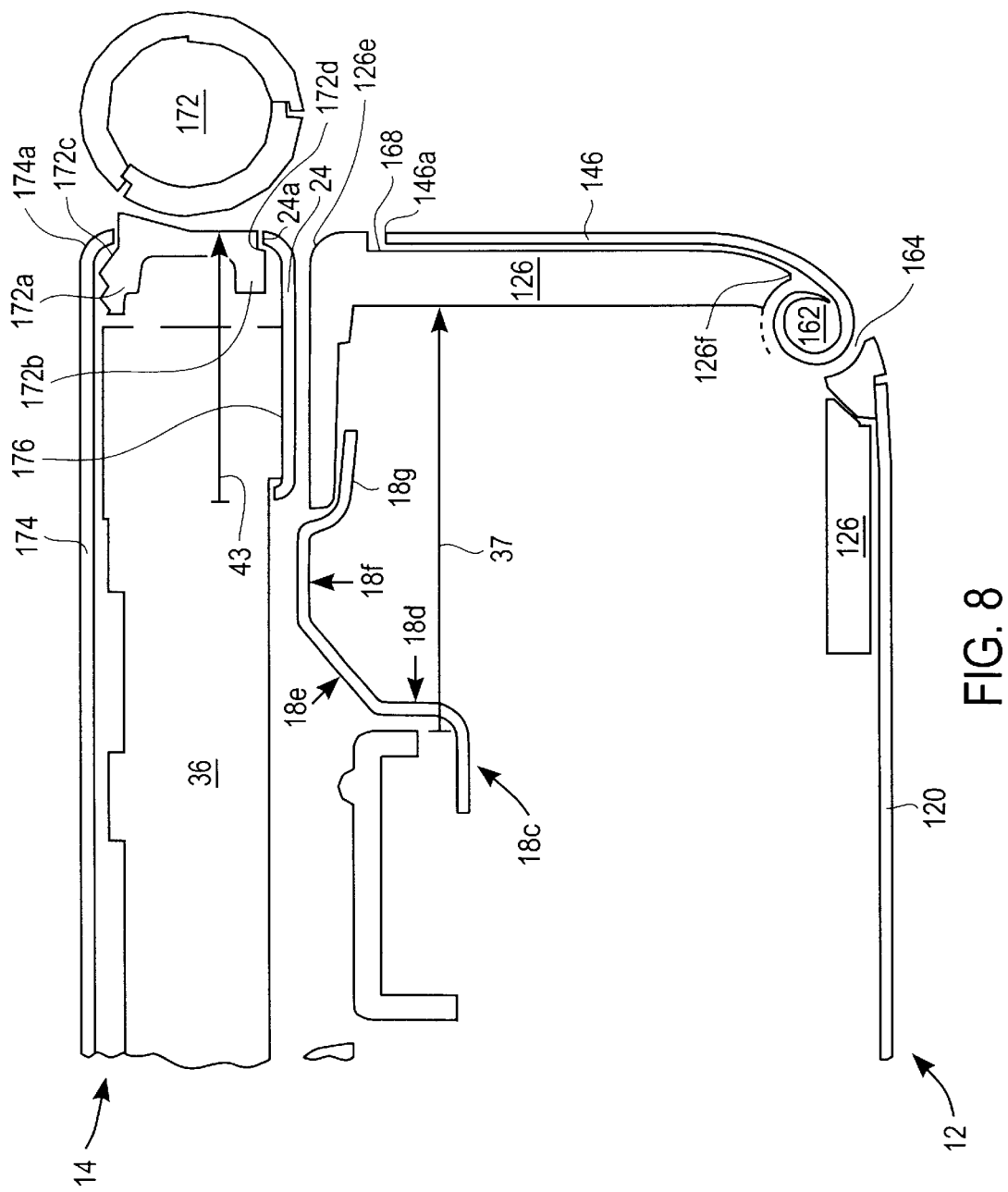
FIG. 8 shows an exploded cross-sectional side view of a rear section a notebook computer's main and display housings according to an aspect of the present invention.

As shown in FIGS. 7 and 8, a cutout portion 168 is centered in the rear exterior portion of perimeter frame 126 about 1 mm from the top edge 126e. Preferably, the dimensions of cutout portion 168 are about 10 mm by 200 mm wide by 2 mm deep. Peripheral ports 148 contained within cutout portion 168 function to connect peripheral devices such as printers and scanners to computer 10. In FIG. 8, bottom edge 126f of frame 126 is shown curved slightly inward towards the interior of main housing 12 to accommodate J-shaped pivoting access door 146. Bottom portion 126f includes pivot area 164 in which pivot means 162 is mounted and connected to access door 146. Preferably, pivoting access door 146 is fabricated of titanium or a titanium alloy. The dimensions of access door 146 measure about 10 mm high by approximately 200 mm wide.

Referring again to FIG. 7, to access peripheral ports 148, a user uses a finger or fingers to pull top edge 146a of access door outwards and downwards to a horizontally disposed open position shown. To close access door 146, a user simply places a finger or fingers of one hand under the horizontally disposed access door 146 and pushes access door 146 upwards to the closed position shown in FIG. 8. As mentioned above, pivot 162 may be spring-loaded to provide a restoring force that moves access door 146 to the closed position. Similarly, magnets (not shown) or a latch assembly (not shown) of the type commonly employed in notebook computers may be used to hold access door 146 in the closed position. Pivot 162 may be one of the kind commonly found in the art and adapted for use in notebook computers. An example of a suitable pivot is found in a Macintosh Powerbook G3 manufactured by Apple Computer, Inc. of Cupertino, Calif.

Referring again to FIG. 8, there is shown according to a presently preferred embodiment of the invention, a cross-sectional side view of the display housing 14 and main housing 12 of a notebook computer 10. Display housing 14 is shown folded over on top of the main housing 12 in the closed position. Display housing 14 includes a top display surface 174, preferably made of titanium or a titanium alloy, a rotatable clutch means 172, a display screen 36, and a display bezel 24. In a preferred embodiment, top display surface 174 is formed of a single piece of titanium having beveled, or curved, edges as shown in FIGS. 8 and 9. In one embodiment, the length 43 between the end of the display housing and the bottom most viewable portion of the display is approximately in the range of 10 mm to 30 mm. In an embodiment, distance 37 between the back edge of the posterior most row of the keyboard and the back end of the main housing 12 is in the approximate range of 5 mm to 27 mm.

As illustrated in FIG. 8, the bottom edge 174a of the display top surface 174 is curved and gluably joined to the clutch means 172. Typically made of a metal such as zinc or aluminum, top portion 172a and bottom portion 172b of rotatable clutch means 28 have shoulders 172c and 172d, respectively that fit within the beveled bottom edges of the display top surface 174 and display bezel 24 to provide structurally strong bonding points. Typically, bottom edge 24a of display bezel 24 is not glued to rotatable clutch 28. Instead, bezel 24 is gluably attached to LCD 36 at bonding area 176 as illustratively shown. The distance from bottom edge 24b of display bezel to top edge 24a measures about 4 mm, however, this distance is illustrative only, and will vary according to the overall dimensions of the display screen 36 and display housing 14 used.

Figure 9:
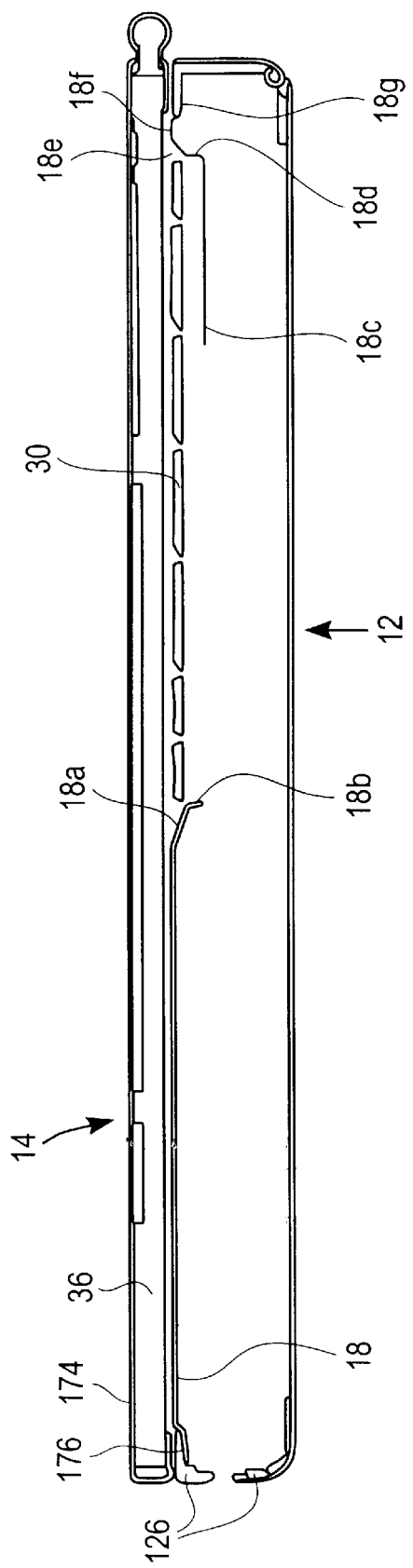
FIG. 9 provides a cross-sectional side view of the main and display casings of a closed notebook computer position according to an aspect of the present invention.

Referring now to FIG. 9. According to one aspect of the present invention, the front portion of top display surface 174 is curved over in a J-shape. In a preferred embodiment, the dimensions of the display housing 14 are approximately the same as the dimensions of the main housing 12. Typically, the titanium sheet used to fabricate portions of display housing 14 and main housing 12 is approximately 0.5 mm thick.

According to a preferred embodiment of the present invention, main top surface 18 is formed of titanium or a titanium alloy measuring approximately 0.5 mm thick. As shown in cross-section in FIGS. 8 and 9, main top surface 18 extends from the front of main case 12 towards and under keyboard 30. The front edge of main top surface forms a lip 176. Lip 176 according to the preferred embodiment, slips under underside lip portion 132 of top perimeter frame 126a to gluably mount the exterior surface of main top surface 18 approximately flush with the exterior of frame 126a.

Near the front of keyboard 30, main top surface 18 forms a free-form shape in which angled surface 18a and leg 18b define a cavity for mounting keyboard 30 such that the tops of the keys on keyboard 30 are approximately flush with the top surface of the main top surface 18.

Near the rear of keyboard 30, main top surface 18 is bent into a modified S-shape. First lip 18c runs the width of main housing 12 and extends horzont ally to wards the rear of main housing 12. Approximately under the top edge of the top row of keys, lip 18c curves upwards to form leg 18d, which curves upwards towards the back of housing 12 to form oblique surface 18e, which bends toward the rear of housing 12 to form leg 18f, which curves downward and backward to form lip 18g.

Figure 10:
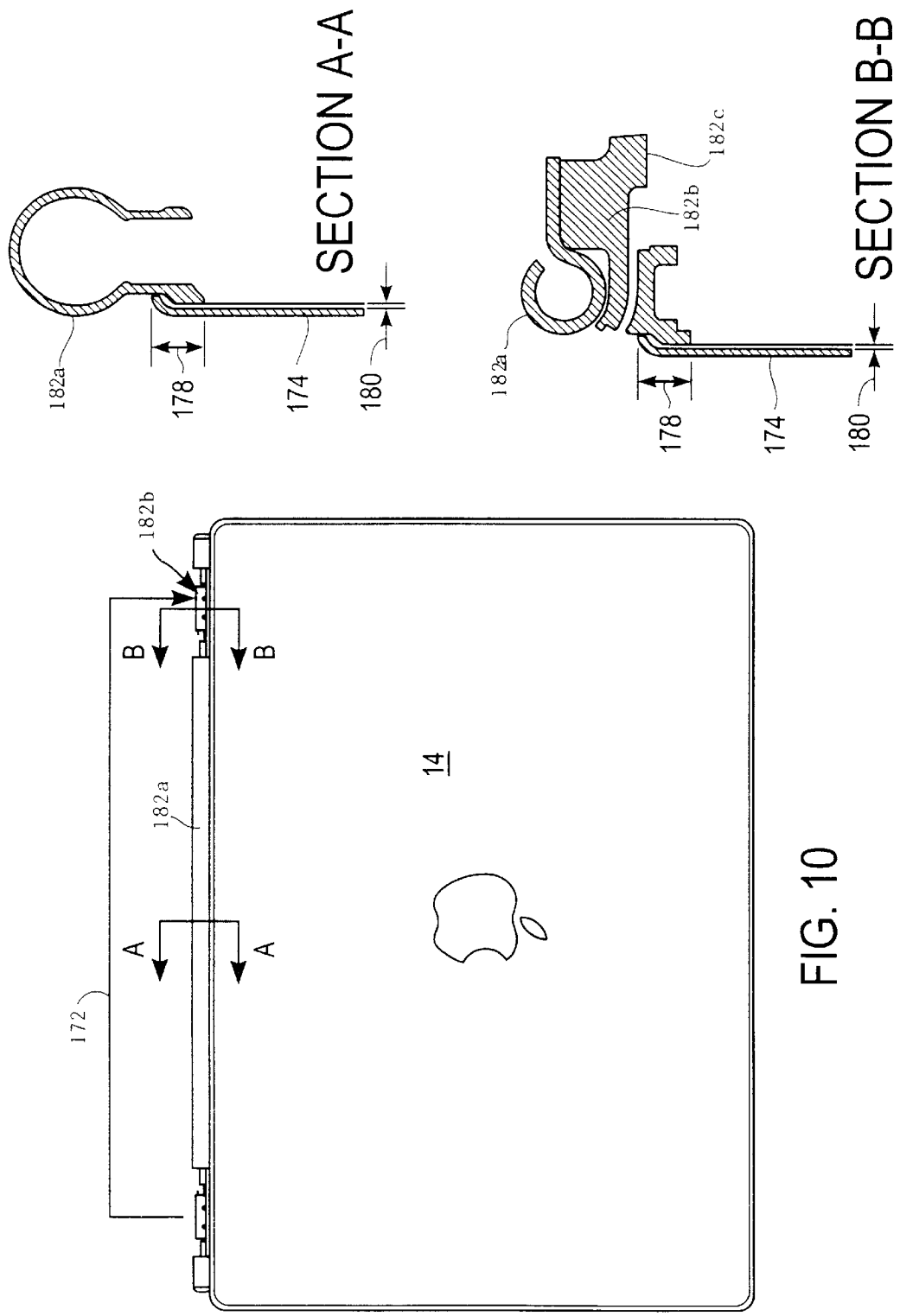
FIG. 10 shows an exemplary embodiment of a clutch according to one aspect of the invention.

FIG. 10 shows an exemplary embodiment of a rotatable clutch means 172. According to one aspect of the invention, portions of rotatable clutch means 172 are glued to main housing 12 and to display housing 14. Clutch means 172 includes a barrel 182a and a clutch 182b. Barrel 182a is generally cylindrical and includes portions extending a distance 178 measuring approximately 2.4–3.0 mm under top display surface 174, which is separated from barrel 182a by a distance 180 measuring approximately 0.2 mm. Clutch 182b is glued directly to a portion of main housing 12 (not shown) at glue point 182c. According to one aspect of the invention, no screws used to attach clutch 182b to main housing 12.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A laptop personal computer, comprising:
   a display housing; and
   a main housing having a top perimeter frame bonded to a center perimeter frame, said center perimeter frame bonded to a bottom perimeter frame, said bottom perimeter frame having angled bayonet features, wherein said main housing is rotatably coupled to said display housing and having a bottom case, said bottom case comprising titanium.

2. A laptop personal computer as recited in claim 1, wherein an angle of said bayonet features and a corresponding bayonet receptor is approximately 45 degrees.

3. A laptop personal computer, comprising:
   a display housing; and
   a main housing having a top perimeter frame bonded to a center perimeter frame, said center perimeter frame bonded to a bottom perimeter frame, said top and bottom perimeter frames having a gluable surface, wherein said main housing is rotatably coupled to said display housing and having a bottom case, said bottom case comprising titanium.

4. A laptop personal computer as recited in claim 3 wherein said gluable surface is smooth.

5. A laptop personal computer as recited in claim 4 wherein a continuous bead of glue is applied to said gluable surface.

6. A laptop personal computer as recited in claim 3 wherein said gluable surface includes grooves or pockets.

7. A laptop personal computer as recited in claim 6 wherein said glue groove is wedge shaped.

8. A laptop personal computer as recited in claim 6 wherein said glue pocket is Z, K, X, Y or L shaped.

9. A laptop personal computer, comprising;
   a display housing; and
   a main housing, said main housing rotatably coupled to said display housing and having a bottom case, said bottom case comprising titanium and being detachable from said main housing, wherein said bottom case is formed of a single piece of titanium or a titanium alloy having beveled edges, said case having angled bayonet receptors corresponding to angled bayonet features, said angled bayonet receptors being located on interior portions of said beveled edges.

10. A laptop personal computer, comprising:
    a display housing;
    a main housing coupled to said display housing, said main housing having a perimeter frame, said perimeter frame including a peripheral device port, a gluable surface, said main housing having a bottom case comprising titanium, said bottom case including bayonet receptors;
    angled bayonet features formed on said perimeter frame, said features corresponding to said receptors; and
    an access door connected to said main housing.

11. A laptop personal computer of claim 10, wherein said perimeter frame comprises a top frame bonded to a center frame, said center frame bonded to a bottom frame.

12. A laptop personal computer as recited in claim 11 wherein said top, center, and bottom perimeter frames comprise injection molded materials.

13. A laptop personal computer as recited in claim 10 wherein said access door comprises titanium or a titanium alloy.

14. A laptop personal computer as recited in claim 10 wherein the angle of said bayonet features and said corresponding bayonet receptors is approximately 45 degrees.

15. A laptop personal computer as recited in claim 10 wherein said gluable surface is smooth.

16. A laptop personal computer as recited in claim 15 wherein a continuous bead of glue is applied to said gluable surface.

17. A laptop personal computer as recited in claim 10 wherein said gluable surface includes one of grooves or pockets.

18. A laptop personal computer as recited in claim 17 wherein said glue groove is wedge shaped.

19. A laptop personal computer as recited in claim 17 wherein and said glue pocket is Z, K, X, Y, or L shaped.

20. A laptop personal computer as claimed in claim 10 wherein said main housing further includes internal heat producing components.

21. A laptop personal computer as claimed in claim 20 wherein said titanium bottom case insulates a computer user from heat produced by said internal components.

22. A laptop personal computer as recited in claim 10 wherein said bottom case further comprises a cut-out portion in which a peripheral component can be removably inserted.

23. A laptop personal computer as recited in claim 22 wherein said peripheral component is a battery.

* * * * *